United States Patent
Yoon et al.

(10) Patent No.: US 9,334,192 B2
(45) Date of Patent: May 10, 2016

(54) DIELECTRIC CERAMIC COMPOSITION AND MULTILAYER CERAMIC CAPACITOR USING THE SAME

(71) Applicants: SAMSUNG ELECTRO-MECHANICS CO., LTD., Suwon-Si, Gyeonggi-Do (KR); RESEARCH & BUSINESS FOUNDATION SUNGKYUNKWAN UNIVERSITY, Suwon-Si, Gyeonggi-Do (KR)

(72) Inventors: Seok-Hyun Yoon, Suwon (KR); Masaki Takaki, Suwon (KR); Yoon-Ah Roh, Suwon (KR); Dae-Ho Yoon, Suwon (KR); Chang-Hoon Kim, Suwon (KR); Doo-Young Kim, Suwon (KR)

(73) Assignees: SAMSUNG ELECTRO-MECHANICS CO., LTD., Suwon-Si, Gyeonggi-Do (KR); RESEARCH & BUSINESS FOUNDATION SUNGKYUNKWAN UNIVERSITY, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/661,725

(22) Filed: Mar. 18, 2015

(65) Prior Publication Data

US 2016/0090325 A1    Mar. 31, 2016

(30) Foreign Application Priority Data

Sep. 25, 2014    (KR) .................. 10-2014-0128574

(51) Int. Cl.
| | |
|---|---|
| C04B 35/468 | (2006.01) |
| C04B 35/47 | (2006.01) |
| C04B 35/475 | (2006.01) |
| H01G 4/12 | (2006.01) |
| H01B 3/12 | (2006.01) |
| H01G 4/012 | (2006.01) |
| H01G 4/228 | (2006.01) |

(52) U.S. Cl.
CPC ............. *C04B 35/47* (2013.01); *C04B 35/4682* (2013.01); *H01B 3/12* (2013.01); *H01G 4/012* (2013.01); *H01G 4/1227* (2013.01); *H01G 4/228* (2013.01); *C04B 2235/3236* (2013.01); *C04B 2235/3239* (2013.01); *C04B 2235/3267* (2013.01); *C04B 2235/3298* (2013.01); *C04B 2235/3418* (2013.01)

(58) Field of Classification Search
CPC .. C04B 35/4682; C04B 35/465; C04B 35/47; C04B 35/475; H01B 3/12; H01G 4/12
See application file for complete search history.

(56) References Cited

U.S. PATENT DOCUMENTS

2008/0242532 A1* 10/2008 Nishikawa .......... C04B 35/4682
                                                            501/138
2015/0280105 A1* 10/2015 Saya ................... H01L 41/1878
                                                            310/366

*Primary Examiner* — Karl Group
(74) *Attorney, Agent, or Firm* — McDermott Will & Emery LLP

(57) ABSTRACT

The present invention relates to a dielectric ceramic composition, method for preparing the same, and electronic device using the same. According to the present invention, there is provided a dielectric ceramic composition which allows use of a nickel internal electrode, sintering under a reducing atmosphere, and having 1000 or higher dielectric constant while providing excellent dc-bias properties and reliability which is close to paraelectric property. The composition of the present invention can generate high effective capacity under high DC voltage, have strong resistance against electrostatic discharge (ESD) damage, and be used for preparing an electronic device having low acoustic noise.

9 Claims, 1 Drawing Sheet

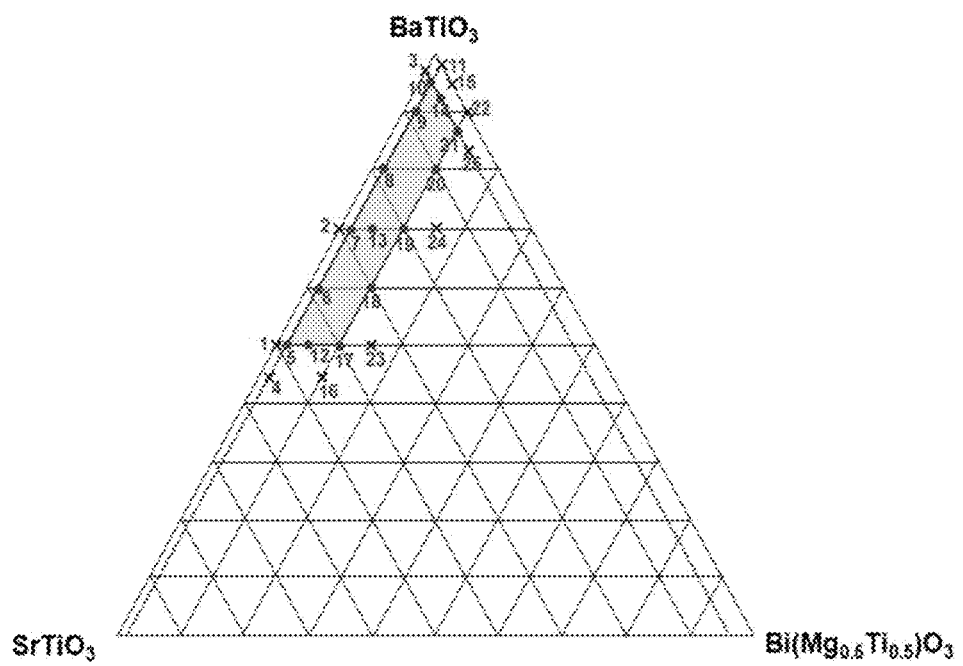

DIELECTRIC CERAMIC COMPOSITION AND MULTILAYER CERAMIC CAPACITOR USING THE SAME

CROSS REFERENCE TO RELATED APPLICATION

This application claims the benefit of Korean Patent Application No. 10-2014-0128574, filed on Sep. 25, 2014, entitled "Dielectric ceramic composition and multilayer ceramic capacitor using the same", which is hereby incorporated by reference in its entirety into this application.

BACKGROUND OF THE INVENTION

1. Technical Field

The present invention relates to a dielectric ceramic composition, a method for preparing the same and an electronic device using the same.

2. Description of the Related Art

A conventional composition system of a dielectric material of a BME multilayer ceramic capacitor having high capacity such as X5R, X7R or X8R, etc. includes a main material including $BaTiO_3$ as a main component and accessary components. The largest percentage components among the accessary components are fixed-valence acceptor elements and rare-earth elements, and then variable-valence acceptors and sintering aids enhancing sinterability. In such a system, the rare earth elements and the fixed-valence acceptors react with $BaTiO_3$ to form a core-shell structure which provides the dielectric property of an electronic device such as a multilayer ceramic capacitor, a piezoelectric element, a chip inductor, a chip varistor, a chip resistor and the like.

PRIOR ART

US Patent No.: U.S. Pat. No. 5,818,686
Jpn. J. Appl. Phys., 42, Part 1, No. 1, 1-15 (2003).

SUMMARY OF THE INVENTION

An object of the present invention is to provide a dielectric ceramic composition which allows sintering under a reducing atmosphere, providing excellent dc-bias property and reliability which is close to paraelectric property, while maintaining high dielectric constant, a method for preparing the same, and an electronic device using the same.

The present invention provides a dielectric ceramic composition by mixing paraelectric $SrTiO_3$ having very low Curie temperature ($T_c$, ~−250° C.), ferroelectric $BaTiO_3$ having Curie temperature of 125° C., and ferroelectric $Bi(Mg_{0.5}Ti_{0.5})O_3$ having very high Curie temperature ($T_c$, ~450° C. or higher) in an appropriate ratio, adding a first accessary component including an oxide or carbonate of a variable-valence acceptor element and a second accessary component including $SiO_2$ or glass frit including $SiO_2$, and sintering the result under a reducing atmosphere.

According to the present invention, there is provided a dielectric ceramic composition which allows use of a nickel internal electrode, sintering under a reducing atmosphere, and having 1000 or higher dielectric constant while providing excellent dc-bias property and reliability which is close to the paraelectric property. The composition of the present invention can generate high effective dielectric constant under the high DC voltage, have strong resistance against electrostatic discharge (ESD) damage, and be used for preparing an electronic device having low acoustic noise.

BRIEF DESCRIPTION OF DRAWING

FIG. 1 illustrates composition ranges of main components to provide target properties.

DESCRIPTION OF THE EXEMPLARY EMBODIMENTS

The present invention will be explained in more detail below.

According to an aspect of the present invention, there is provided a dielectric ceramic composition comprising a main component of $xBaTiO_3$-$ySrTiO_3$-$zBi(Mg_{0.5}Ti_{0.5})O_3$ (molar ratio $x+y+z=1$, $0.5 \leq x \leq 0.99$, $0.01 \leq z \leq 0.1$), a first accessary component comprising an element selected from the group consisting of Mn, V, Cr, Fe, Ni, Co, Cu and Zn, and a second accessary component which is $SiO_2$ or a glass-forming material comprising $SiO_2$.

Bi content of the dielectric ceramic composition according to an embodiment of the present invention may be 1-10 at % based on elements included in main material powder which is a main component. When the content of Bi is in this range, it allows to provide non-reducible property to sinter under a reducing atmosphere and to manufacture a multilayer ceramic capacitor using a Ni electrode. However, when the content of Bi is more than 10 at %, it may be difficult to sinter the composition under a reducing atmosphere.

In an embodiment, the first accessary component may be an oxide or carbonate of an element chosen from Mn, V, Cr, Fe, Ni, Co, Cu and Zn. Here, the elements act as a variable-valence acceptor element.

In an embodiment, content of the first accessary component may be 0.1-3.0 at % based on the total composition. That is, the element chosen from Mn, V, Cr, Fe, Ni, Co, Cu and Zn included in the first accessary component may be 0.1-3.0 at % in the composition. The unit of at % is the relative proportion of atoms with respect to the main material powder.

In an embodiment, $SiO_2$ content of the second accessary component may be 0.2-10 at %. The $SiO_2$ content may be 0.2-10 at % with respect to the main material powder. For example, the content can be selected within an appropriate range as described in Examples depending on desired properties.

In an embodiment, the first accessary component may be $MnO_2$ or $V_2O_5$. Content of $MnO_2$ may be selected to an appropriate range as described in Examples of the present invention depending on desired properties.

In an embodiment, the dielectric composition satisfies X5R, X7R or X8R properties specified in EIA standards.

According to another aspect of the present invention, there is provided a method for preparing a dielectric substance comprising sintering a main component of $xBaTiO_3$-$ySrTiO_3$-$zBi(Mg_{0.5}Ti_{0.5})O_3$ (molar ratio $x+y+z=1$, $0.5 \leq x \leq 0.99$, $0.01 \leq z \leq 0.1$), 0.1-3.0 at % of a first accessary component comprising an element selected from the group consisting of Mn, V, Cr, Fe, Ni, Co, Cu and Zn, and 0.2-10 at % of a second accessary component which is $SiO_2$ or a glass-forming material comprising $SiO_2$ under a reducing atmosphere. Here, the glass-forming material may include glass frit.

In an embodiment, the first accessary component may be $MnO_2$ or $V_2O_5$. Content of $MnO_2$ may be selected to an appropriate range as described in Examples of the present invention depending on desired properties.

As described above, the composition of the present invention can be sintered in a reducing atmosphere and allows use of Ni internal electrode.

According to further another aspect of the present invention, there is provided an electronic device comprising a plurality of dielectric substance ceramic layers, an internal electrode formed between the dielectric substance ceramic layers, and an external electrode connected electrically to the internal electrode, wherein the dielectric ceramic layer comprises a main component of $xBaTiO_3$-$ySrTiO_3$-$zBi(Mg_{0.5}Ti_{0.5})O_3$ (molar ratio $x+y+z=1$, $0.5 \leq x \leq 0.99$, $0.03 \leq y \leq 0.49$, $0.01 \leq z \leq 0.1$), 0.1-3.0 at % of a first accessary component comprising an element selected from the group consisting of Mn, V, Cr, Fe, Ni, Co, Cu and Zn, and 0.2-10 at % of a second accessary component which is $SiO_2$ or a glass-forming material comprising $SiO_2$. The electronic device may be at least one selected from the group consisting of a multilayer ceramic capacitor, a piezoelectric element, a chip inductor, a chip varistor, and a chip resistor.

In an embodiment, the first accessary component may be $MnO_2$ or $V_2O_5$. Content of $MnO_2$ may be selected to an appropriate range as described in Examples of the present invention depending on desired properties.

Hereinafter, although more detailed descriptions will be given by examples, those are only for explanation and there is no intention to limit the invention. The scope of the present invention should be interpreted by the following claims and it should be interpreted that all spirits equivalent to the following claims fall with the scope of the present invention.

EXAMPLES $BaTiO_3$—$SrTiO_3$—$Bi(Mg_{0.5}Ti_{0.5})O_3$ powder which is main material powder was prepared by employing a solid-state reaction method. Starting materials were $BaCO_3$, $SrCO_3$, $TiO_2$, $Bi_2O_3$, $MgCO_3$. $BaCO_3$ and $TiO_2$. BaCO3 and TiO2 powders were mixed with a ball mill and calcinated at 800-900° C. to obtain $BaTiO_3$ powder having 200 nm of an average particle size. $SrCO_3$, $TiO_2$, $Bi_2O_3$, $MgCO_3$ were weighted to be ratios of $SrTiO_3$ and $Bi(Mg_{0.5}Ti_{0.5})O_3$ as in Table 1, mixed with a ball mill, and calcinated at 800-900° C. to obtain $SrTiO_3$—$Bi(Mg_{0.5}Ti_{0.5})O_3$ powder having 200 nm of an average particle size.

TABLE 1

| Examples | The first main component $BaTiO_3$ (x) | The second main component $SrTiO_3$ (y) | The third main component $Bi(Mg_{0.5}Ti_{0.5})O_3$ (z) | The first accessary component $MnO_2$ (mol %) | The first accessary component $V_2O_5$ (mol %) | The second accessary component $SiO_2$ (mol %) |
|---|---|---|---|---|---|---|
| 1  | 0.50 | 0.50 | 0.00 | 0.500 | 0.000 | 1.00 |
| 2  | 0.70 | 0.30 | 0.00 | 0.500 | 0.000 | 1.00 |
| 3  | 0.97 | 0.03 | 0.00 | 0.500 | 0.000 | 1.00 |
| 4  | 0.45 | 0.54 | 0.01 | 0.500 | 0.000 | 1.00 |
| 5  | 0.50 | 0.49 | 0.01 | 0.500 | 0.000 | 1.00 |
| 6  | 0.60 | 0.39 | 0.01 | 0.500 | 0.000 | 1.00 |
| 7  | 0.70 | 0.29 | 0.01 | 0.500 | 0.000 | 1.00 |
| 8  | 0.80 | 0.19 | 0.01 | 0.500 | 0.000 | 1.00 |
| 9  | 0.90 | 0.09 | 0.01 | 0.500 | 0.000 | 1.00 |
| 10 | 0.96 | 0.03 | 0.01 | 0.500 | 0.000 | 1.00 |
| 11 | 0.99 | 0.00 | 0.01 | 0.500 | 0.000 | 1.00 |
| 12 | 0.50 | 0.45 | 0.05 | 0.500 | 0.000 | 1.00 |
| 13 | 0.70 | 0.25 | 0.05 | 0.500 | 0.000 | 1.00 |
| 14 | 0.92 | 0.03 | 0.05 | 0.500 | 0.000 | 1.00 |
| 15 | 0.95 | 0.00 | 0.05 | 0.500 | 0.000 | 1.00 |
| 16 | 0.45 | 0.45 | 0.10 | 0.500 | 0.000 | 1.00 |
| 17 | 0.50 | 0.40 | 0.10 | 0.500 | 0.000 | 1.00 |
| 18 | 0.60 | 0.30 | 0.10 | 0.500 | 0.000 | 1.00 |
| 19 | 0.70 | 0.20 | 0.10 | 0.500 | 0.000 | 1.00 |
| 20 | 0.80 | 0.10 | 0.10 | 0.500 | 0.000 | 1.00 |
| 21 | 0.87 | 0.03 | 0.10 | 0.500 | 0.000 | 1.00 |
| 22 | 0.90 | 0.00 | 0.10 | 0.500 | 0.000 | 1.00 |
| 23 | 0.50 | 0.35 | 0.15 | 0.500 | 0.000 | 1.00 |
| 24 | 0.70 | 0.15 | 0.15 | 0.500 | 0.000 | 1.00 |
| 25 | 0.82 | 0.03 | 0.15 | 0.500 | 0.000 | 1.00 |
| 26 | 0.92 | 0.03 | 0.05 | 0.000 | 0.000 | 1.00 |
| 27 | 0.92 | 0.03 | 0.05 | 0.100 | 0.000 | 1.00 |
| 28 | 0.92 | 0.03 | 0.05 | 0.300 | 0.000 | 1.00 |
| 29 | 0.92 | 0.03 | 0.05 | 1.000 | 0.000 | 1.00 |
| 30 | 0.92 | 0.03 | 0.05 | 3.000 | 0.000 | 1.00 |
| 31 | 0.92 | 0.03 | 0.05 | 4.000 | 0.000 | 1.00 |
| 32 | 0.92 | 0.03 | 0.05 | 0.500 | 0.250 | 1.00 |
| 33 | 0.92 | 0.03 | 0.05 | 1.500 | 0.750 | 1.00 |
| 34 | 0.92 | 0.03 | 0.05 | 2.000 | 1.000 | 1.00 |
| 35 | 0.92 | 0.03 | 0.05 | 0.500 | 0.000 | 0.00 |
| 36 | 0.92 | 0.03 | 0.05 | 0.500 | 0.000 | 0.20 |
| 37 | 0.92 | 0.03 | 0.05 | 0.500 | 0.000 | 5.00 |
| 38 | 0.92 | 0.03 | 0.05 | 0.500 | 0.000 | 10.00 |
| 39 | 0.92 | 0.03 | 0.05 | 0.500 | 0.000 | 15.00 |

The prepared $BaTiO_3$ and $SrTiO_3$—$Bi(Mg_{0.5}Ti_{0.5})O_3$ main material powder were weighted to be compositions as in Table 1. $MnO_2$ or $V_2O_5$ and glass frit or sintering aids including $SiO_2$ of accessary components were added to be compositions in Table 1. Ethanol/toluene, a dispersing agent, and a binder were added to the mixture of the main components and accessary components by using a zirconia ball as mixing/dispersing media and ball milling was performed for 20 hours to provide a slurry. The obtained slurry was performed for a doctor blade coating method to make cast sheet having thicknesses of 5.0 μm and 10-13 μmt. Ni internal electrode was printed on the cast sheet. Top and bottom covers were made by laminating cover sheets (10-13 μm thickness) by the number of 25 sheets and a bar was made by laminating and pressing 21-layers of printed activation sheets. The bar was cut by a cutter to chips having a size of 3.2 mm×1.6 mm. The obtained chips having a size of 3216 were baked out; then sintered in a reducing atmosphere 1% $H_2$/99% $N_2$ ($H_2O/H_2/N_2$ atmosphere) at a temperature range of from 1100 to 1150° C. for 2 hours; and then applied with a heat treatment at 1000° C. under $N_2$ atmosphere for 3 hours. The sintered chips were applied with a termination process with Cu paste and with an electrode sintering method to obtain an external electrode.

The completed prototype MLCC sample was evaluated in view of capacitance, DF, insulation resistance, TCC, and resistance deterioration behavior, depending on a voltage step increase at a high temperature of 150° C., or the like.

Room temperature capacitance and dielectric loss of the MLCC chip were measured under conditions of 1 kHz and 0.2 Wpm of AC, using an LCR-meter.

A dielectric constant of the MLCC chip was calculated from capacitance, a thickness of the dielectric layer of the MLCC chip, an area of the internal electrodes, and the number of stacked layers.

By taking 10 samples, room temperature insulation resistance (IR) thereof was measured after DC 10 V/μm was applied thereto for 60 seconds.

The TCC depending on temperature was measured in a temperature range from −55° C. to 150° C.

In a high temperature IR voltage-boost test, resistance deterioration behavior thereof was measured by increasing a voltage step by 5 Wpm at 150° C., and 10 minutes was required for respective steps, while resistance values were measured at 5-second intervals.

High temperature withstand voltage was deduced from the high temperature IR voltage-boost test, and the withstand

TABLE 2

Ni-MLCC prototype SPL property

| Ex. | Room temperature dielectric constant | DF (%) | Room temperature resistivity (Ohm-cm) | TCC (−55° C.) (%) | TCC (125° C.) (%) | DC-bias (%) @5 V/μm | High temperature (150° C.) withstanding voltage (V/μm) | Results |
|---|---|---|---|---|---|---|---|---|
| 1 | 1204 | 2.80 | 8.560E+12 | 16.8 | −26.8 | −25.4 | 55.0 | x |
| 2 | 1845 | 3.40 | 8.120E+12 | 12.4 | −22.4 | −29.6 | 55.0 | x |
| 3 | 3548 | 6.50 | 1.040E+13 | −8.4 | −11.5 | −45.2 | 55.0 | x |
| 4 | 925 | 4.20 | 5.640E+12 | −12.6 | −23.4 | −10.5 | 50.0 | x |
| 5 | 1002 | 3.40 | 5.890E+12 | −12.1 | −13.7 | −12.4 | 50.0 | ○ |
| 6 | 1006 | 3.50 | 6.320E+12 | −11.9 | −13.5 | −16.4 | 55.0 | ○ |
| 7 | 1013 | 3.30 | 7.110E+12 | −12.0 | −12.8 | −18.7 | 55.0 | ○ |
| 8 | 1025 | 3.69 | 8.040E+12 | −12.5 | −12.7 | −20.4 | 55.0 | ○ |
| 9 | 1036 | 4.12 | 8.550E+12 | −13.1 | −12.4 | −22.5 | 55.0 | ○ |
| 10 | 1047 | 4.62 | 8.610E+12 | −12.4 | −11.8 | −24.5 | 55.0 | ○ |
| 11 | 1845 | 5.86 | 5.770E+12 | −13.5 | −13.7 | −36.1 | 55.0 | x |
| 12 | 1007 | 4.12 | 4.560E+12 | −14.8 | −14.4 | −11.2 | 50.0 | ○ |
| 13 | 1032 | 4.44 | 4.680E+12 | −13.5 | −13.1 | −13.7 | 50.0 | ○ |
| 14 | 1158 | 4.58 | 4.320E+12 | −11.4 | −12.8 | −16.4 | 55.0 | ○ |
| 15 | 1967 | 5.47 | 5.550E+12 | −12.2 | −13.3 | −35.4 | 55.0 | x |
| 16 | 823 | 3.12 | 3.680E+12 | −11.8 | −13.8 | −10.4 | 50.0 | x |
| 17 | 1011 | 5.55 | 6.340E+12 | −12.8 | −12.4 | −14.8 | 55.0 | ○ |
| 18 | 1045 | 5.69 | 6.710E+12 | −13.2 | −12.7 | −15.2 | 55.0 | ○ |
| 19 | 1066 | 5.71 | 7.110E+12 | −13.8 | −12.4 | −17.7 | 55.0 | ○ |
| 20 | 1074 | 5.84 | 7.060E+12 | −11.5 | −11.8 | −20.1 | 55.0 | ○ |
| 21 | 1092 | 5.65 | 6.360E+12 | −14.4 | −10.7 | −22.8 | 55.0 | ○ |
| 22 | 1767 | 5.27 | 3.260E+12 | −11.8 | −11.1 | −35.2 | 55.0 | x |
| 23 | 1005 | 4.12 | 4.180E+10 | −12.5 | −14.2 | −13.2 | 40.0 | x |
| 24 | 1023 | 4.72 | 3.250E+10 | −12.4 | −13.8 | −16.8 | 35.0 | x |
| 25 | 1032 | 4.89 | 3.670E+10 | −12.7 | −12.4 | −19.4 | 35.0 | x |
| 26 | 13245 | 458.50 | 6.540E+07 | — | — | — | — | x |
| 27 | 1181 | 5.12 | 3.860E+12 | −12.5 | −14.7 | −18.4 | 45.0 | ○ |
| 28 | 1167 | 4.63 | 4.660E+12 | −11.7 | −12.7 | −16.1 | 50.0 | ○ |
| 29 | 1103 | 4.55 | 5.580E+12 | −13.5 | −13.7 | −16.1 | 50.0 | ○ |
| 30 | 1002 | 3.67 | 2.560E+12 | −13.6 | −12.8 | −12.5 | 60.0 | ○ |
| 31 | 684 | 2.84 | 5.390E+11 | −13.2 | −10.4 | −8.8 | 60.0 | x |
| 32 | 1088 | 4.48 | 6.580E+12 | −13.2 | −13.4 | −14.1 | 55.0 | ○ |
| 33 | 1010 | 3.59 | 3.240E+12 | −13.2 | −12.5 | −11.8 | 60.0 | ○ |
| 34 | 672 | 2.64 | 6.470E+11 | −12.9 | −10.8 | −8.5 | 60.0 | x |
| 35 | 637 | 3.02 | 7.420E+10 | −14.2 | −10.2 | −7.4 | 25.0 | x |
| 36 | 1047 | 4.16 | 3.890E+12 | −12.1 | −13.2 | −15.7 | 50.0 | ○ |
| 37 | 1046 | 4.23 | 4.680E+12 | −12.8 | −11.5 | −15.8 | 55.0 | ○ |
| 38 | 1006 | 4.30 | 5.890E+12 | −11.6 | −11.8 | −14.3 | 55.0 | ○ |
| 39 | 871 | 3.98 | 7.690E+12 | −11.8 | −12.0 | −10.4 | 50.0 | x | voltage indicates a voltage, IR of which was resistant to a $10^5 \Omega$ or more, when the resistance value was measured by applying a voltage step of 5V/μm of DC to a 3216 sized-chip having a 20-layered dielectric with a thickness of 3.2 μm after performing a sintering process, at 150° C., for 10 minutes, and then continuously increasing the voltage step. Table 2 exhibits properties of prototype chips having the compositions shown in Table 1.

In Examples 1 to 3, each content of the first main component x and the second main component y was changed in the main material powder $xBaTiO_3$-$ySrTiO_3$-$zBi(Mg_{0.5}Ti_{0.5})O_3$ (x+y+z=1) when contents of $MnO_2$ of the first accessary component and sintering aids of the second accessary component were 0.5 wt % and 1.0 at %, respectively, and content of $Bi(Mg_{0.5}Ti_{0.5})O_3$ of the third main component z was zero. The corresponding properties of the Examples 1 to 3 were shown in Table 2. When z=0 and x content was 0.50, 0.70 as in Examples 1 and 2, TCC (125° C.) was deviated from −15% of X7R standards. In Example 3, when x content was 0.97, the dielectric constant was rapidly increased to more than 3500 and dc-bias property was significantly changed by more than −30%. It is accordingly noted that when z=0, the following required properties cannot be satisfied: (1) dielectric constant: 1000 or higher; (2) room temperature resistivity: 1E12 Ohm-cm or higher' (3) X7R temperature property requirements; (4) dc-bias (DC-bias) change: less than −30%; and (5) high temperature withstanding voltage 50 V/um.

In Examples 4-11, the amount of the third main component z=0.01, and when x content was 0.45 (Example 4), the dielectric constant was less than 1000, when x content was 0.99 (Example 11), the dielectric constant was higher than 1800 and thus dc-bias property was significantly changed to −36%. On the other hand, when x content was between 0.5 and 0.96 (Examples 5-10), all required properties were satisfied.

In Example 12-15, the amount of the third main component z=0.05, and when x content was between 0.5 and 0.92 (Examples 12-14), all required properties were satisfied, while when x content was 0.95 (Example 15), the dielectric constant was increased to higher than 1900 and thus the dc-bias property was changed to −35.4%.

In Examples 16-22, the amount of the third main component z=0.1, and when x content was 0.45 (Example 16), the dielectric constant became less than 1000 and when x content was 0.90 (Example 22), the dielectric constant was increased to higher than 1700 and thus the dc-bias property was changed to −35.2%. On the other hand, when x content was between 0.5 and 0.87 (Examples 17-21), all required properties were satisfied.

In Examples 23-25, when the amount of the third main component z=0.15, the high temperature withstanding voltage property was not satisfied since it was less than 50V/um regardless of the x content.

The result of Examples 1-25 can be illustrated in FIG. 1 of which each red point represents the compositions of Examples which satisfy all required properties and each x point represents the compositions of Examples which do not satisfy some properties from the required properties. Accordingly, composition ranges of the main components which satisfy all required properties can be expressed as the area marked in gray.

In Examples 26-31, when the first accessary component was not added (Example 26), insulation resistance was not obtained and thus the room temperature resistivity was lowered to less than 1E+11 Ohm-cm. When the content of the first accessary component $MnO_2$ was significantly increased to 4.0 mol % (Example 31), the room temperature dielectric constant became less than 1000. On the other hand, when the content of the first accessary component $MnO_2$ was between 0.1 and 3.0 mol % (Examples 27-30), all required properties were satisfied.

In Examples 32-34, a part of the first accessary component $MnO_2$ was replaced with $V_2O_5$. When total content of the first accessary component was the same, properties for the composition with Mn alone and the composition with Mn and V were all most same (Example 29 and 32, or Example 30 and 33), while when total content of the first accessary component was more than 4 at % (Example 34), the room temperature dielectric constant was deteriorated to less than 1000 which showed the same result with the composition with Mn alone (Example 31).

In Examples 35-39, when the second accessary component was not added (Example 35), the sintering density became lowered, the dielectric constant was less than 1000, and the insulation resistance was not obtained, resulting in lowering the room temperature resistivity to less than 1E+11 Ohm-cm. When the content of the second accessary component was significantly increased to 15.0 mol % (Example 39), the room temperature dielectric constant was less than 1000. On the other hand, when the content of the second accessary component was between 0.2 and 10.0 mol % (Examples 36-38), all required properties were satisfied.

As described above, the present invention provides a dielectric ceramic composition which satisfies X5R, X7R, or X8R properties specified in EIA standards, a method for preparing the same and an electronic device using the same. According to the present invention, the dielectric ceramic composition allows use of a nickel internal electrode, sintering under a reducing atmosphere, and having excellent reliability and dc-bias properties which further allows manufacturing a multilayer ceramic capacitor having high capacity.

Paraelectric $SrTiO_3$ having very low Curie temperature ($T_c$, ~250° C.), ferroelectric $BaTiO_3$ having Curie temperature of 125° C. and ferroelectric $Bi(Mg_{0.5}Ti_{0.5})O_3$ having very high Curie temperature (450° C. or higher) are mixed in an appropriate ratio and then a sintering aids including $SiO_2$ and $MnO_2$ are added, and sintered under a reducing atmosphere in order to obtain the object of the present invention. As a result, non-reducible property is obtained to allow use of a Ni internal electrode and the room temperature dielectric constant having 1000 or higher is also obtained while maintaining the paraelectric property. Further, the dielectric constant change is very small, and excellent insulation resistance and reliability can be obtained.

It further allows sintering under a reducing atmosphere, and having 1000 or higher dielectric constant while providing excellent dc-bias properties and reliability which is close to the paraelectric property.

The exemplary embodiments of the present invention described hereinabove are only an example of the present invention and may be variously modified and altered by those skilled in the art to which the present invention pertains without departing from essential features of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall with the scope of the present invention.

What is claimed is:

1. A dielectric ceramic composition comprising a main component of $xBaTiO_3$-$ySrTiO_3$-$zBi(Mg_{0.5}Ti_{0.5})O_3$ (molar ratio x+y+z=1, 0.5≤x≤0.99, 0.01≤z≤0.1), a first accessary component comprising an element selected from the group consisting of Mn, V, Cr, Fe, Ni, Co, Cu and Zn, and a second accessary component which is $SiO_2$ or a glass-forming material comprising $SiO_2$.

2. The dielectric ceramic composition of claim 1, wherein the first accessary component is an oxide or carbonate of an element selected from the group consisting of Mn, V, Cr, Fe, Ni, Co, Cu and Zn.

3. The dielectric ceramic composition of claim 1, wherein content of the first accessary component is 0.1-3.0 at %.

4. The dielectric ceramic composition of claim 1, wherein $SiO_2$ content in the second accessary component is 0.2-10 at %.

5. The dielectric ceramic composition of claim 1, wherein the first accessary component is $MnO_2$ or $V_2O_5$.

6. The dielectric ceramic composition of claim 1, wherein the dielectric composition satisfies X5R, X7R or X8R properties specified in EIA standards.

7. A method for preparing a dielectric substance comprising sintering a main component of $xBaTiO_3$-$ySrTiO_3$-$zBi(Mg_{0.5}Ti_{0.5})O_3$ (molar ratio x+y+z=1, 0.5≤x≤0.99, 0.1-3.0 at % of a first accessary component comprising an element selected from the group consisting of Mn, V, Cr, Fe, Ni, Co, Cu and Zn, and 0.2-10 at % of a second accessary component which is $SiO_2$ or a glass-forming material comprising $SiO_2$ under a reducing atmosphere.

8. An electronic device comprising a plurality of dielectric substance ceramic layers, an internal electrode formed between the dielectric substance ceramic layers, and an external electrode connected electrically to the internal electrode,
wherein the dielectric ceramic layer comprises a main component of $xBaTiO_3$-$ySrTiO_3$-$zBi(Mg_{0.5}Ti_{0.5})O_3$ (molar ratio x+y+z=1, 0.5≤x≤0.99, 0.01≤z≤0.1), 0.1-3.0 at % of a first accessary component comprising an element selected from the group consisting of Mn, V, Cr, Fe, Ni, Co, Cu and Zn, and 0.2-10 at % of a second accessary component which is $SiO_2$ or a glass-forming material comprising $SiO_2$.

9. The electronic device of claim 8, wherein the electronic device is at least one selected from the group consisting of a multilayer ceramic capacitor, a piezoelectric element, a chip inductor, a chip varistor and a chip resistor.

* * * * *